(12) United States Patent
Kollmansberger et al.

(10) Patent No.: US 8,010,691 B2
(45) Date of Patent: Aug. 30, 2011

(54) CONTENT TAGGING OF MEDIA STREAMS

(75) Inventors: Kurt Kollmansberger, Spring Branch, TX (US); Michael Keohane, Shrewsbury, MA (US); William VerSteeg, Alpharetta, GA (US); James Clark, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 12/344,719

(22) Filed: Dec. 29, 2008

(65) Prior Publication Data

US 2010/0169503 A1 Jul. 1, 2010

(51) Int. Cl.
 G06F 15/16 (2006.01)
(52) U.S. Cl. ..................... 709/231; 709/246
(58) Field of Classification Search .............. 709/231, 709/246
See application file for complete search history.

(56) References Cited

U.S. PATENT DOCUMENTS

| | | | |
|---|---|---|---|
| 7,689,510 B2* | 3/2010 | Lamkin et al. | 705/51 |
| 7,779,097 B2* | 8/2010 | Lamkin et al. | 709/223 |
| 7,831,730 B1* | 11/2010 | Markowitz et al. | 709/231 |
| 7,882,201 B2* | 2/2011 | Frazier et al. | 709/217 |
| 2003/0115253 A1* | 6/2003 | Barbir et al. | 709/202 |
| 2008/0195664 A1* | 8/2008 | Maharajh et al. | 707/104.1 |
| 2008/0207137 A1* | 8/2008 | Maharajh et al. | 455/74 |
| 2008/0235722 A1 | 9/2008 | Baugher et al. | |
| 2008/0240155 A1* | 10/2008 | Cosquer et al. | 370/466 |
| 2008/0310428 A1* | 12/2008 | Lei et al. | 370/400 |
| 2009/0003432 A1 | 1/2009 | Liu et al. | |
| 2009/0157747 A1* | 6/2009 | McLean et al. | 707/104.1 |

OTHER PUBLICATIONS

H. Schulzrinne et al., "RTP: A Transport Protocol for Real-Time Applications," Network Working Group, Request for Comments: 1889, pp. 1-75, Jan. 1996.
M. Handley et al., "SDP: Session Description Protocol," Network Working Group, Request for Comments: 2327, pp. 1-42, Apr. 1998.
M. Baugher et al., "The Secure Real-time Transport Protocol (SRTP)," Network Working Group, Request for Comments: 3711, pp. 1-56, Mar. 2004.
H. Schulzrinne et al., "RTP: A Transport Protocol for Real-Time Applications," Network Working Group, Request for Comments: 3550, pp. 1-104, Jul. 2003.
H. Schulzrinne et al., "RTP Profile for Audio and Video Conferences with Minimal Control," Network Working Group, Request for Comments: 3551, pp. 1-44, Jul. 2003.

* cited by examiner

*Primary Examiner* — Douglas B Blair
(74) *Attorney, Agent, or Firm* — Merchant & Gould (57) ABSTRACT

In one embodiment, a network device comprises a tag processor configured to process a media stream received at the network device. The media stream is sent through a network to a desired destination. The tag processor comprises at least one of a tag inserter module and a tag module. The tag inserter module inserts a tag into the media stream, the tag indicating content of the media stream and the network device providing the tag. The tag module identifies and reports a value of a tag received within the media stream, and forwards the media stream to a user and/or compares the identified value to an expected tag value, and forwards the media stream to a user in the event that the comparison indicates a match. The present invention embodiments further include a method and logic for content tagging of the media stream.

20 Claims, 10 Drawing Sheets

CONTENT TAGGING OF MEDIA STREAMS

BACKGROUND

With advances in computer networking combined with the development of powerful home computers and modern operating systems, the ability to provide streaming media has become more viable and in turn the demand for such streaming media has significantly increased. As the demand for streaming media increases, the ability to verify program and ad content carried within a given media stream has become useful. In conventional communication systems, in order to verify program content being carried within a given media stream, inspection devices (e.g., deep packet inspection (DPI) devices) can be deployed which are operable to decode the content of the streaming media. DPI devices have the ability to inspect Layer 2 through Layer 7 of the OSI model (Open System Interconnection model), including headers and data protocol structures as well as the actual payload of the message. These DPI devices can identify and classify the traffic based on a signature database that includes information extracted from the data part of a packet.

In addition, a moving pictures expert group transport stream (MPEG2-TS) header may include an optional field that allows for placement of a program identifier indicating a program provider call sign (e.g., CBS Broadcasting Inc. (CBS), Discovery Channel (DSC), Disney Channel (DIS), Entertainment and Sports Programming Network (ESPN), etc.). The MPEG2-TS header is part of the IP payload. However, since some encryption implementations encrypt the MPEG2-TS header (while others do not), this optional field is typically not used nor supported by all MPEG-2 TS devices.

DESCRIPTION OF EXAMPLE EMBODIMENTS

Overview

A network device comprises a tag processor configured to process a media stream received at the network device. The media stream is sent through a network to a desired destination. The tag processor comprises at least one of a tag inserter module and a tag module. The tag inserter module inserts a tag into the media stream, wherein the tag indicates content of the media stream and the network device providing the tag. The tag module may identify and report a value of a tag received within the media stream, forward the stream to a user, and/or may further compare the identified value to an expected tag value, and forward the media stream to a user in the event that the comparison indicates a match. The present invention embodiments further include a method and logic for content tagging of the media stream.

Currently, carriers desiring to "verify" that the proper program or ad content is contained in a given media stream (e.g., video flow) deploy expensive deep packet inspection (DPI) devices which decode headers, data protocol structures, and the actual payload of the media stream (e.g., streaming video) in order to identify the media content within a packet. Since most of the media streams are encrypted, deploying such DPI devices to decode and perform verification of these media streams is even more difficult and expensive. It is to be understood that a media stream can be delivered to an end user on demand or live. On demand streams are stored on a server, and are available to be transmitted at a user's request. Live streams are available at a particular time, as in a video stream of a live sporting event.

Figure 1:
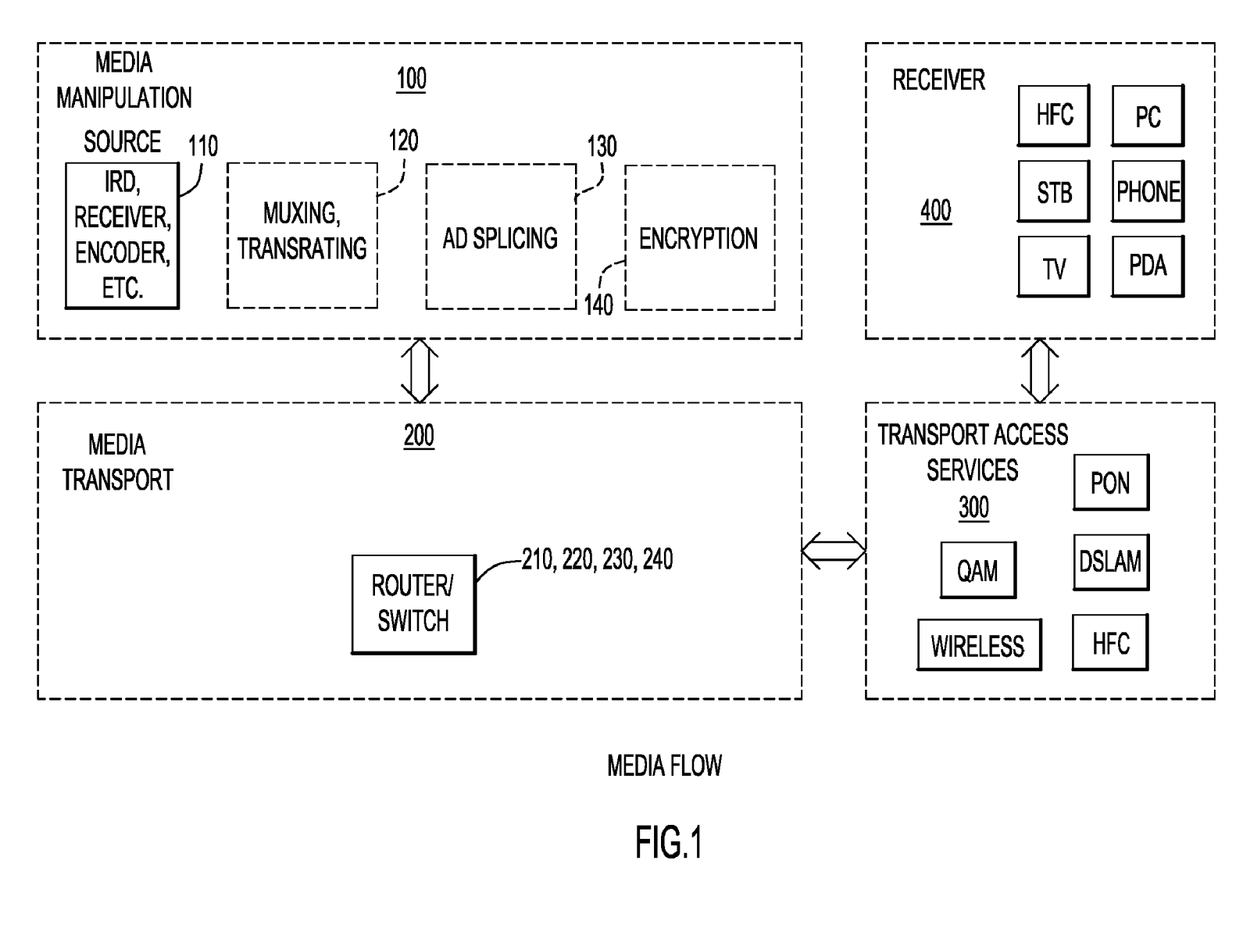
FIG. 1 is a diagrammatic illustration of an example wide area network (WAN) transporting a media stream with content tagging, according to an embodiment of the present invention.

Typical carrier networks (e.g., wide area network (WAN), etc.) employ a variety of carrier devices and access services in the delivery of media streams to end users (e.g., media manipulation devices, media transport devices, media transport access services, media receiver devices, etc.). An example WAN delivering media streams and employing content tagging to identify content according to an embodiment of the present invention is illustrated in FIG. 1. Specifically, the WAN includes a media manipulation device 100, a media transport device 200, an access service 300, and a receiver device 400. A media stream is generated by or stored in media manipulation device 100. The media stream is transported via at least one media transport device 200, and subsequently delivered over access service 300 to receiver device 400. Media manipulation device 100 may include source devices 110 (e.g., integrated receiver decoder (IRD), receivers, encoders, etc.), multiplexing and/or transrating devices 120, ad splicing devices 130, and encryption devices 140. These devices may be local to one another or connected via transport devices 200 including router switches 210-240. The manipulated media is transported to receiver device 400 by transport access services 300. These services include, but are not limited to: Quadrature Amplitude Modulation (QAM), Wireless, Passive Optical Network (PON), Digital Subscriber Line Access Multiplexer (DSLAM), and Hybrid Fiber Coaxial (HFC). Receiver device 400 receives and provides the media in a suitable form for the end-users. The receiver devices include, but are not limited to: Set-top Boxes (STB), Televisions (TV), Personal Computers (PC), Game Consoles, Wireless Phones, and Personal Data Assistants (PDA).

Content tagging of the present invention embodiments inserts tags or markers into a media stream (e.g., streaming video, audio or data) during the course of transporting the media stream over a carrier network in order to identify stream content. For example, the tags or markers may be inserted into the IP header portion of the media stream. Content tagging media devices, that examine or alter the program content of the media stream or its transmission container (e.g., Program Specific Information (PSI) tables for MPEG-2 transport streams), can insert the marker or tag within the packet flow of the media stream to indicate program or ad content of the media stream. The tag could be placed, for example, into the IP transport layer (e.g., Real-time Transport Protocol (RTP)) of the media stream. The tag may further identify the equipment inserting the tag. As the media stream is advanced through the network, or in the event that the content of the media stream is presented for use to an application, the tags or markers can be examined to determine if the correct content is present. Based on the result of the examination, some action could be taken (e.g., a report may be generated (e.g., a content verification report indicating that the expected content had been delivered or an exception report indicating that content other than the expected content had been received), or the media stream content may be filtered). With the content tags inserted into the media stream, the media devices and services (e.g., media manipulation devices 100, media transport devices 200, media transport access services 300, and media receiver devices 400) used for delivering the media stream to end users may readily identify the content of the media stream being delivered by inspecting the inserted content tags.

Figure 2:
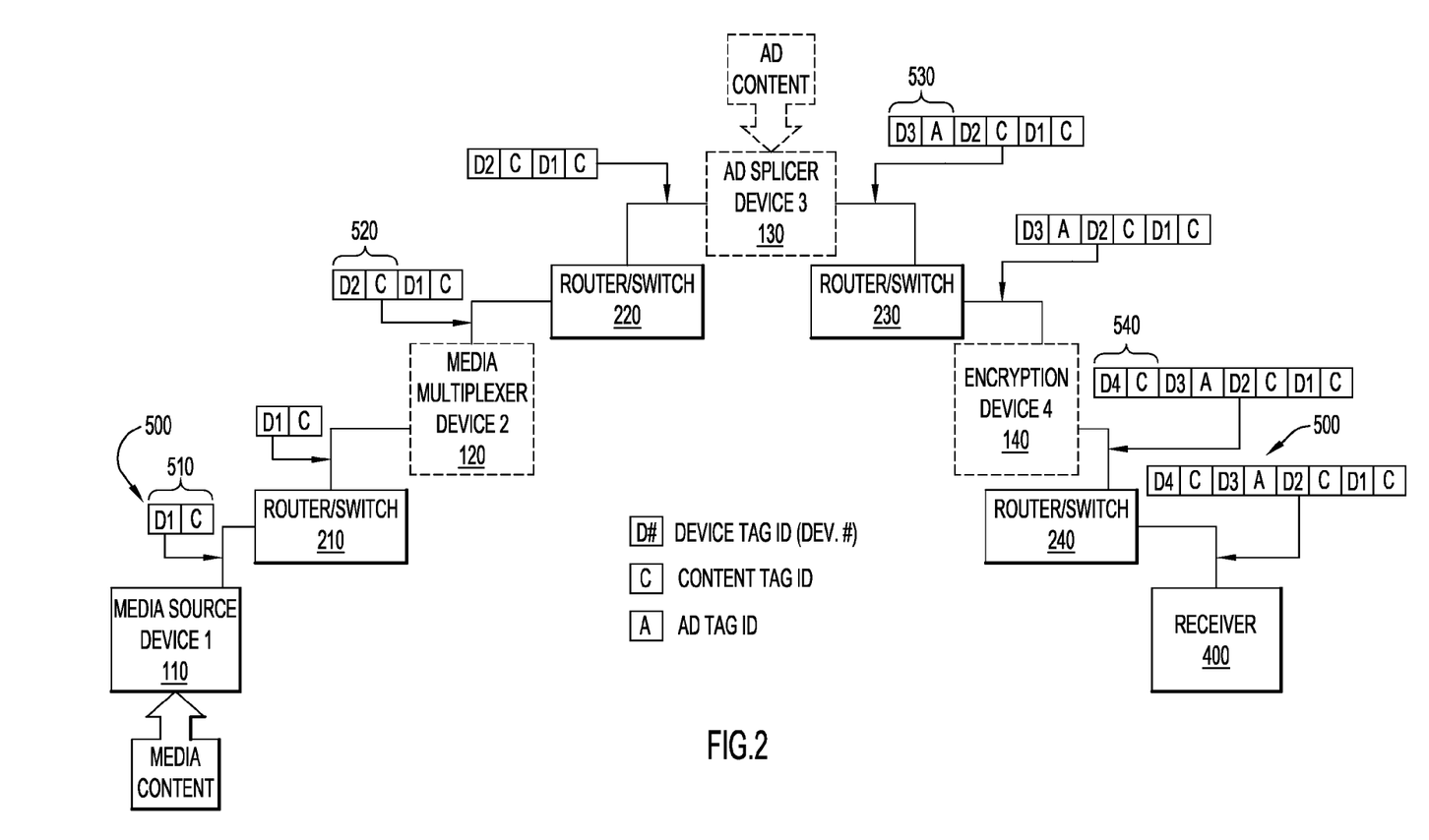
FIG. 2 is a flow diagram illustrating content tagging of a media stream advancing through the WAN of FIG. 1, according to an embodiment of the present invention.

An example wide area network (WAN) transporting a media stream (e.g., streaming video) with content tagging according to an embodiment of the present invention is illustrated in FIG. 2. Initially, media source device 110 (e.g., an encoder or a statistical multiplexer) establishes a tag stack 500. Tag stack 500 comprises a succession of at least one data set or tag set 510 providing information pertaining to the content of the media stream as described below. As the streaming media content advances through the transport network, a tag set may be appended to the tag stack by certain devices in a linear fashion. By way of example, source 110 receives media content and generates a media stream with a tag stack 500 including tag set 510 (e.g., indicating the content (C) of the media stream and identifying source 110 (D1)). The media stream advances through the transport network via router 210 and encounters media multiplexer 120. The media multiplexer processes the media stream (e.g., combines the media stream with other streams to share a common network path, adjusts the bit rate or other characteristics, etc.), appends a tag set 520 (e.g., indicating the content (C) of the media stream and identifying media multiplexer 120 (D2)) to tag stack 500, and forwards the media stream with the modified tag stack 500 through the network via router 220. As the media stream encounters ad splicer 130 to splice ad content into the media stream, the ad splicer appends a tag set 530 (e.g., indicating the content of the spliced ad content (A) and identifying ad splicer 130 (D3)) to tag stack 500, and forwards the media stream with the spliced ad content and the modified tag stack 500 through the network via router 230. The media stream further encounters encryption device 140 to encrypt the content of the media stream, where the encryption device appends a tag set 540 (e.g., indicating the content (C) of the media stream and identifying encryption device 140 (D4)) to tag stack 500, and forwards the encrypted media stream with the spliced ad content and the modified tag stack 500 through the network via router 240 to receiver 400. The media stream encounters routers or switches 210, 220, 230, 240 that may be configured to employ content tagging, according to an embodiment of the present invention, and to direct the advancing media stream through the network towards destined receiver 400. The router or switch may be configured to inspect a tag set of tag stack 500, and forward the media stream through the network with or without appending a further tag set to the tag stack. The router or switch may further be configured to report a content tag of the tag set to an interested system management device. Once the media stream is advanced to receiver 400, the receiver inspects a tag set of tag stack 500 to determine the content of the encrypted media stream. Since the modified tag stack 500 includes both content and device tags, receiver 400 may inspect the tag sets of the tag stack to determine a relative history of devices that had advanced the media stream.

Furthermore, it is to be understood that content tagging, according to an embodiment of the present invention, may employ any number of tagging devices (e.g., source device (110), media manipulation devices (110, 120, 130, 140), router/switch devices (210, 220, 230, 240), media receiver device (400), etc.) and each tagging device may optionally provide a tag set (e.g., tag set 510, 520, 530, 540) as the media stream is forwarded through the network. In addition, tag sets 510, 520, 530, and 540 can be managed in tag stack 500 in any predetermined manner (e.g., first-in-first-out buffering (FIFO)). For example, according to an embodiment of the present invention, media source device 110 may insert tag set 510 into the media stream and each subsequent tagging device (e.g., media manipulation devices (120, 130, 140), and router/switch devices (210, 220, 230, 240)) may inspect tag set 510 of the received media stream and forward the tag stack including tag set 510 inserted by source media device 110 without modification through the network to destined receiver 400. In a further example according to an embodiment of the present invention, media source device 110 may insert tag set 510 into the media stream and forward the media stream with inserted tag set 510 through the network. Media multiplexer device 120 may replace tag set 510 of the received media stream with tag set 520 and forward the media stream with tag set 520 through the network. This behavior may continue in this manner with each subsequent tagging device (e.g., media manipulation devices (130, 140), and router/switch devices (210, 220, 230, 240)) replacing the received tag with a current tag as the media stream is forwarded through the network to the destined receiver 400.

Figure 3:
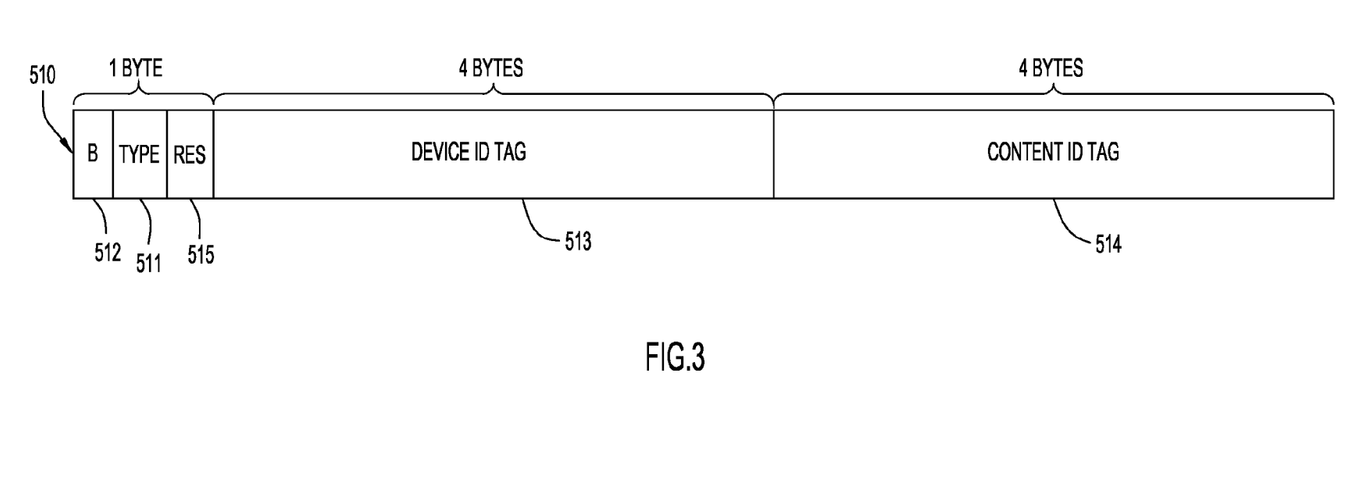
FIG. 3 is a diagrammatic illustration of an example tag set according to an embodiment of the present invention.

An example of a tag set for content tagging of a media stream according to an embodiment of the present invention is illustrated in FIG. 3. Specifically, tag set 510 includes: a type field 511, a block flag field 512, a device id tag field 513, a content id tag field 514, and a reserved field 515. The type field may contain a value indicating, for example, the type of tag (e.g., initial tag, transit tag, or substitute tag). An initial tag type indicates that a respective tag set was inserted in the media stream by a media source device. A transit tag type indicates that a respective tag set was inserted in the media stream by an intermediate tagging device. A substitute tag type indicates that a respective tag set was inserted in the media stream by an intermediate tagging device which substituted the media content (e.g., program content) of the media stream for alternative content (e.g., ad content). The block flag field may contain a value indicating, for example, whether the original content has been blocked. The device id field may contain a value identifying, for example, the device applying the tag set. The content id field may contain a value representing, for example, specific content of the media stream. By way of example, where the tag set is 9 bytes, the block flag field, the type field, and the reserved field collectively are 1 byte, while the device id field and the content id fields are each 4 bytes. However, the fields may represent any feature of the media stream including, but not limited to: the content being delivered, the devices used in the delivery of the media, the source of the media, or the tag itself. Further, these fields may be of any size suitable for the serving protocol.

Figure 4:
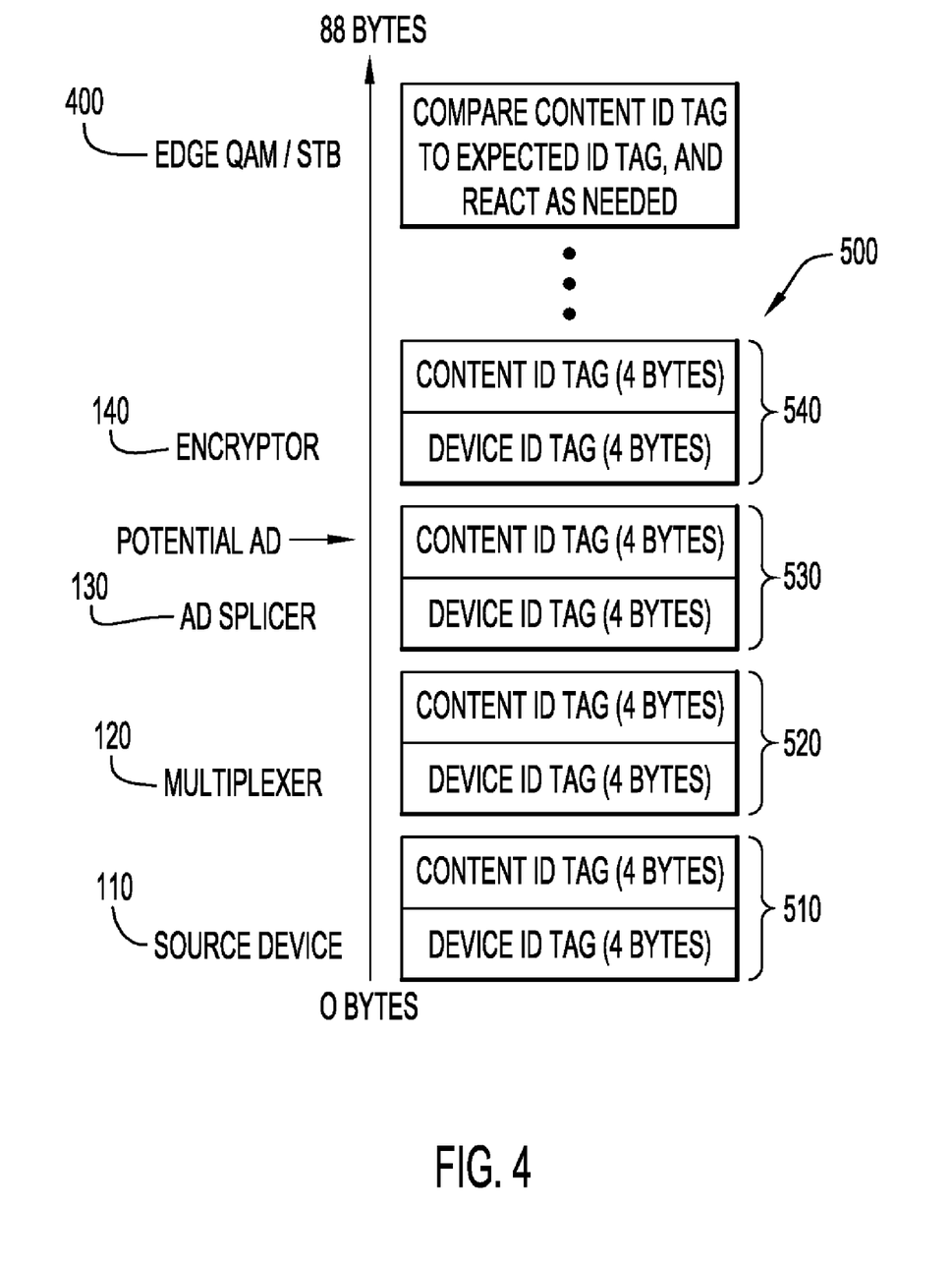
FIG. 4 is a diagrammatic illustration of an example tag stack according to an embodiment of the present invention.

An example of the progression of a tag stack 500 as the media stream advances through a network is illustrated in FIG. 4. Initially, a media source device 110 (FIG. 2) establishes the tag stack by creating an initial tag set 510. Each successive device that manipulates the transport stream or relative content wrapper protocol may add additional tag sets to the tag stack 500, the tag sets including a content id tag representing, for example, the content of the media stream. Specifically, multiplexer 120 may add tag set 520 to the tag stack 500; ad splicer 130 may add tag set 530; encryptor 140 may add tag set 540, and receiver 400 (e.g., Edge QAM or STB) receives the resulting tag stack 500. Tag stack 500 may be of a limited size (e.g., 88 bytes). In this case, the tag stack may accommodate a limited number of tag sets 510, 520, 530, and 540. The tag sets 510, 520, 530, and 540 can be added to and can be managed in tag stack 500 in any predetermined manner (e.g., first-in-first-out buffering (FIFO)). Further, the tag stack may be managed in a manner in which specific tag sets 510, 520, 530, and 540 or specific content or device ids are stored based on a predetermined priority. For example, the tag stack may retain the tag sets including device and content id tags of the devices of an egress portion of the network. According to an embodiment of the present invention, ad splicer 130 may temporarily substitute new tag set 530 including a content id tag representing ad content that is spliced into the media stream and subsequently revert back to the original content id tag of the media stream received by the ad splicer once the spliced media has been forwarded.

If the media stream passes through more tagging devices in the network path than tag stack 500 allows, the tag stack 500 can be managed. For example, the most recently affecting tagging devices may be of greater interest than those devices which the media stream first passed through. In the event that tag stack 500 is full, the tag stack may be managed, for example, in a manner similar to a first-in-first-out (FIFO) buffer. For example, when a modifying device needs to append its identity (i.e., device id) to tag stack 500 and the tag stack limit has been reached, the device would identify the most current content id value from the tag stack, push off the oldest tag set from the "bottom" of the tag stack, then add its own current tag set to the top of the tag stack. Managing tag stack 500 in this manner ensures that the original stream identity (i.e., content id) is not lost. This behavior would continue as the media stream advances through the network until reaching the destined receiver. It is to be understood that the tag stack may be managed in any predetermined manner, for example, in a manner consistent with any of the examples provided above with regard to FIG. 2. Furthermore, it is to be understood that the tag stack may be forwarded by any number of tagging devices including router or switch devices 210, 220, 230, 240, and that the router or switch may be configured to inspect a tag set of tag stack 500, and forward the media stream through the network with or without appending a further tag set to the tag stack. It is to be further understood that the router or switch may be configured to report a content tag of the inspected tag set to an interested system management device.

In addition, there are many different types of content and also different ways to encode and transport that content across a network. IP networks are generally defined to have a particular limitation on the maximum number of bytes in a routable packet (i.e., Maximum Transmission Unit (MTU)); typically the MTU is around 1,500 bytes. Depending on the manner used to create a transport stream, the difference between the actual packet size and the MTU will vary. This will affect the total amount of data that could be stacked in tag stack 500 described above.

Conventionally, with MPEG-2 content, the IP network packet size is comfortably under the MTU ceiling. It is preferable to not exceed the MTU to prevent IP packet fragmentation which could induce jitter and potentially impact content quality. For MPEG-2 video, it is typical for the IP packet size to be between 1,370 and 1410 bytes, which leaves a margin of between 90 and 130 bytes under the 1,500 byte limit of the MTU. In order to leave some headroom for traffic bursts, the size of the tag stack can be limited. Tag stack 500 may be limited, for example, by limiting the number tag sets that can be added to the tag stack (e.g., by adding tag sets of only select devices or by FIFO buffering). The size of tag stack 500 may be limited to 90 bytes, for example. In which case, the tag stack would be able to accommodate ten of the tag sets 510 illustrated in FIG. 4.

Figure 5:
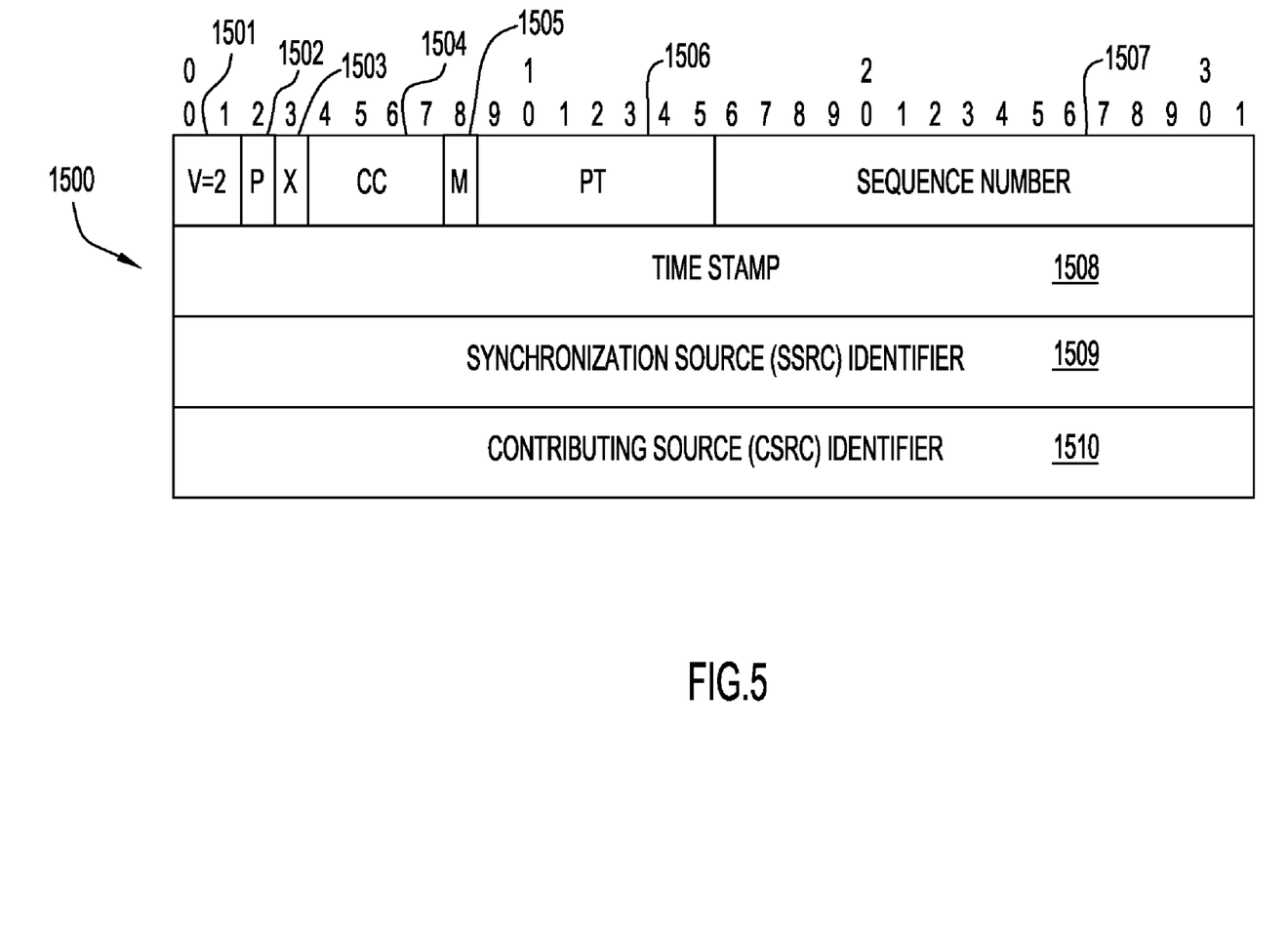
FIG. 5 is a diagrammatic illustration of fixed header fields of a real-time transport protocol (RTP) packet for a media stream employing content tagging according to an embodiment of the present invention.

In order to illustrate the way content tagging operates, MPEG-2 and RTP transport media streams, for example, are described herein. It is to be understood that the present invention can be used with any streaming media protocol and is not limited to the examples relating to MPEG-2 and RTP. An example of fixed header fields of a real-time transport protocol (RTP) packet structure for a media stream employing content tagging according to an embodiment of the present invention is illustrated in FIG. 5. The RTP packet structure fixed header fields 1500 include: version indicator field (V) 1501 (e.g., 2 bits), padding bytes indicator field (P) 1502 (e.g., 1 bit), extension header indicator field (X) 1503 (e.g., 1 bit), contributing source (CSRC) identifier count field (CC) 1504 (e.g., 4 bits), application specific data indicator field (M) 1505 (e.g., 1 bit), payload format indicator field (PT) 1506 (e.g., 7 bits), sequence number field 1507 (e.g., 16 bits), timestamp field 1508 (e.g., 32 bits), synchronization source (SSRC) identifier field 1509 (e.g., 32 bits), and contributing source (CSRC) identifier field 1510 (e.g., 32 bits). Version indicator (V) 1501 indicates the version of the protocol (e.g., version 2). Padding indicator (P) 1502 indicates the presence of extra padding bytes at the end of the RTP packet. Extension header indicator (X) 1503 indicates the presence of an extension header between the fixed header and payload data. CSRC identifier count (CC) 1504 indicates the number of CSRC identifiers with inserted tag sets that follow fixed header 1500. Application specific data indicator (M) 1505 indicates that current data has some special relevance for the application. Payload format indicator (PT) 1506 indicates the format of the payload and determines its interpretation by the application. Sequence number field 1507 indicates the number of RTP data packets sent. The sequence number is incremented for each successive RTP data packet sent and may be used, for example, to determine packet loss and to restore packet sequence. Timestamp field 1508 reflects the sampling instant of the first data in the RTP data packet. SSRC field 1509 uniquely identifies the source of the media stream. CSRC field 1510 enumerates tag sets inserted by tagging devices encountered by the media stream advancing through the network. The inserted tag sets indicate, for example, the content of the media stream.

In one embodiment of the present invention, a simple mode of content tagging may be utilized where only the RTP fixed header would be used. In this case, the source device ID (e.g., a typical 32-bit value of the unique content source IP address) can be inserted in the synchronization source (SSRC) identifier field, and a pre-determined value representing the unique content ID of a media stream can be inserted in the contributing source (CSRC) identifier field. This is a limited representation of the original content, as a 32-bit value derived from a four byte uniform transformation format (UTF) eight character value. If there is a substitution for the original content (e.g., advertising content swap), a second CSRC value could be temporarily appended to the CSRC portion of the RTP header. This preserves the original content ID for end systems verification, and allows for the verification of advertising delivery. The CSRC value is not an IP address like typical CSRC values. An example of RTP packet header fields during this mode of tagging includes:

- the extension header indicator (X) is 0 (indicating no extensions);
- the CSRC count (CC) is 1 (representing only one content ID in the CSRC field);
- the application specific data indicator (M) and payload format indicator (PT) values are relevant to the payload type based on the RTP profile used (e.g., PT=33 indicating MPEG-2 Transport Streams);
- the SSRC value is an IP address of the source device, (e.g., 10.10.10.10 in decimal notation or in binary 00001010 00001010 00001010 00001010); and
- the CSRC value is a value representing the content. The CSRC value may be derived from a 4-byte character based value, converted to an ASCII number, and then converted to a 32-bit binary value (e.g., WABC converted to ASCII is 87 65 66 67 or in binary is 01010111 01000001 01000010 01000011).

During ad insertion, a further CSRC identifier or ad content ID (e.g., a four byte character based value (e.g., A001) may be used and converted to a 32 bit binary value (e.g., 01000001 00000000 00000000 00000001)) is appended and CSRC count (CC) 1504 is incremented to represent the number of CSRC values (e.g., the value 2 in binary is 0010). Alternatively, the CSRC identifier of the media stream content may be replaced by a further CSRC identifier of the ad content. However, at least the expected or reference content identifier of the receiver would need to be updated to match the further CSRC identifier of the ad content in order for the receiver to properly determine that the inserted ad content of the media stream is valid as described below. Further, devices that receive RTP packets that employ content tagging are programmed to properly interpret these fields, and especially when a well-known RTP profile is used in the RTP header. A packet type (PT) value selected from the "unassigned" or "dynamic" ranges may be used to avoid misinterpretation.

Figure 6:
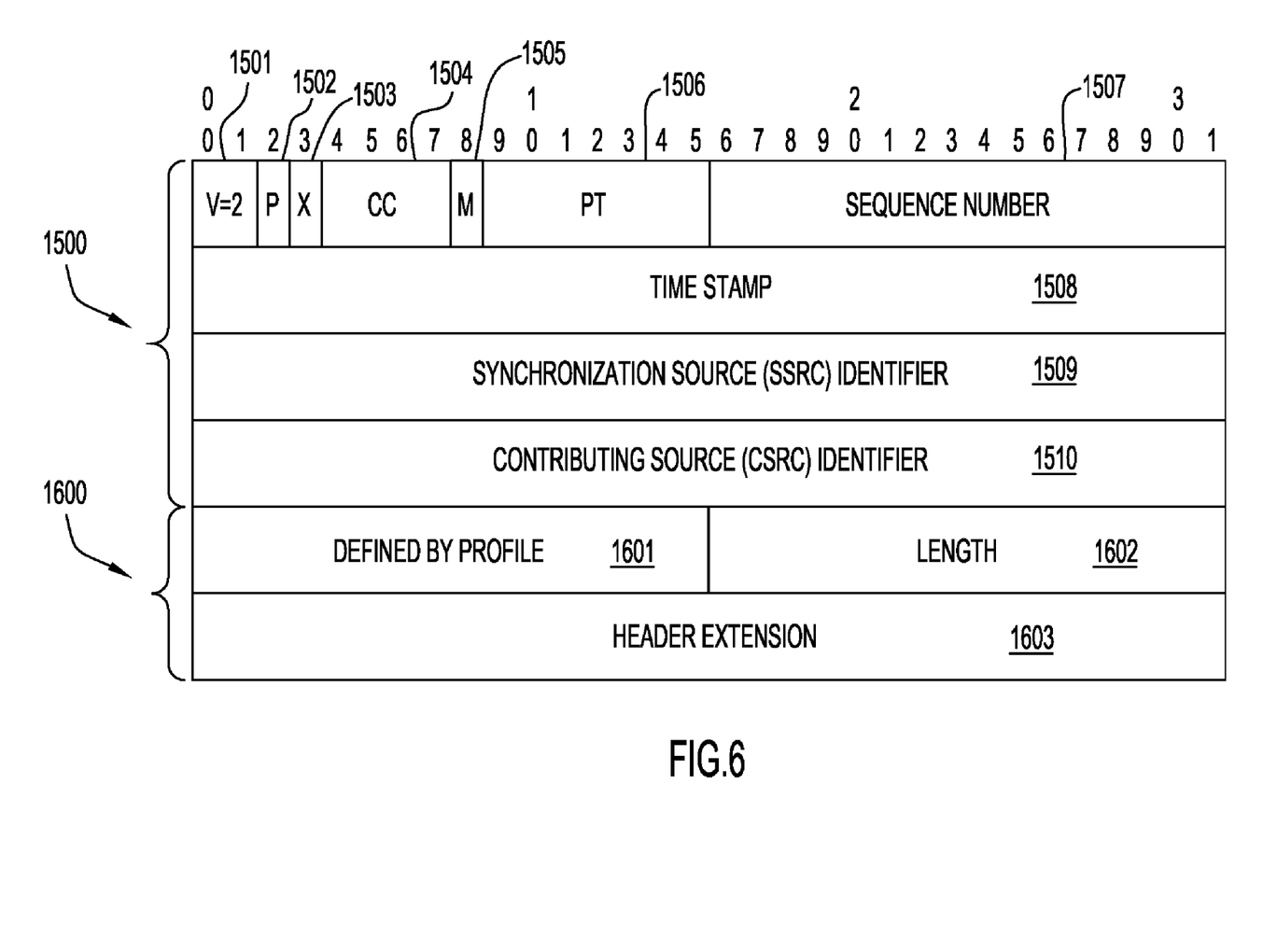
FIG. 6 is a diagrammatic illustration of fixed and extended header fields of an RTP packet for a media stream employing content tagging according to another embodiment of the present invention.

An example of RTP packet structure header fields including header extension fields for a media stream employing content tagging according to another embodiment of the present invention is illustrated in FIG. 6. The header fields 1500 are substantially similar to the fields described above for FIG. 5, and the packet further comprises header extension fields 1600 including: defined by profile field 1601 (e.g., 16 bits), a length field 1602 (e.g., 16 bits), and at least one header extension field 1603 (e.g., 32 bits). The defined by profile field is available to define a set of payload type codes. The length field indicates the length of the extension header fields and is updated accordingly each time a tag set is appended to the header extension. The header extension fields are applied, according to an embodiment of the present invention, after any CSRC identifiers are inserted in the initial RTP packet header and providing that extension header indicator (X) 1503 is set to a value of "1". Depending on the complexity of the content identity tracking required, the RTP header extension may or may not be employed. Complex mode of content tagging, according to an embodiment of the present invention, employs the RTP fixed header 1500 and RTP header extension 1600 to contain the tag stack as described below.

In complex content tagging, the RTP fixed header and the RTP extended header are used to create a representation of the content identification as well as the migration of the content as it passes through many devices in the network. The RTP fixed header including SSRC identifier field 1509 would be used, while CSRC identifier field 1510 could also be used for the content identity value to maintain simple mode compatibility. The addition of RTP extended header 1600 for complex content tagging allows for a variable length block of data to be appended immediately to the end of the RTP fixed or standard header, but before the payload information.

Figure 7:
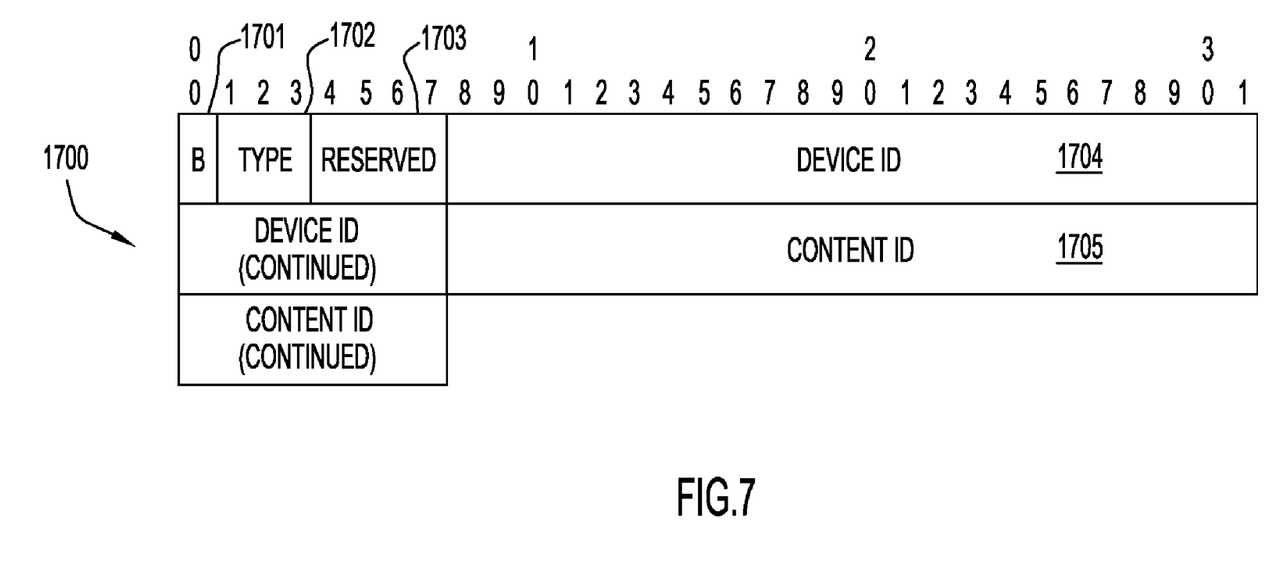
FIG. 7 is a diagrammatic illustration of an example field layout of a tag set that may be inserted into the RTP extended header of a media stream employing content tagging according to an embodiment of the present invention.

Referring to FIG. 7, the data fields for example tag set 1700 of a tag stack contained in the RTP extended header field 1603 include: block flag field (B) 1701 (e.g., 1 bit), tag type field (Type) 1702 (e.g., 3 bits), reserved field (RES) 1703 (e.g., 4 bits), device identifier field 1704 (e.g., 4 bytes), and content identifier field 1705 (e.g., 4 bytes). The device identifier field 1704 is shown being wrapped to a succeeding row, while the content identifier field 1705 is similarly shown being wrapped to a succeeding row. The block flag indicates, for example, content intentionally blocked by this device. The tag type field indicates, for example, the type of tag (e.g., initial tag, transit tag, or substitute tag). An initial tag type indicates that a respective tag set was inserted in the media stream by a media source device. A transit tag type indicates that a respective tag set was inserted in the media stream by an intermediate tagging device. A substitute tag type indicates that a respective tag set was inserted in the media stream by an intermediate tagging device which substituted the media content (e.g., program content) of the media stream for alternative content (e.g., ad content). Reserved field (RES) 1703 is reserved space and may contain a value indicating that the space is empty or unused (e.g., empty=0000). The device identifier field indicates a specific device advancing the media stream through the network. The content identifier field indicates the content of the media stream.

Figure 8:
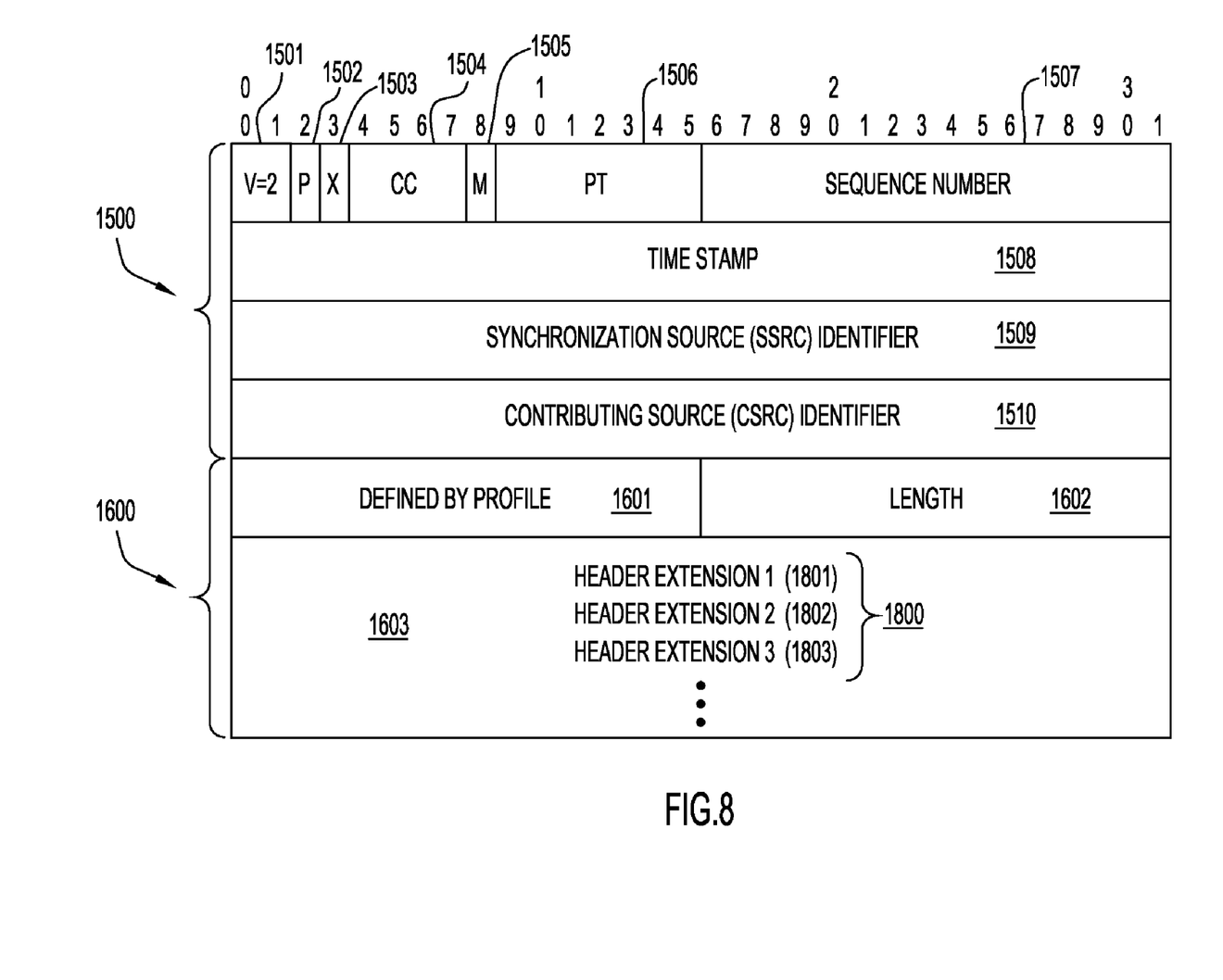
FIG. 8 is a diagrammatic illustration of fixed header fields and a plurality of appended extended header fields of an RTP packet for a media stream employing content tagging according to a further embodiment of the present invention.

An example field layout of an RTP header with an RTP extended header used to accommodate "tag stacking" for complex content tagging is illustrated in FIG. 8. The header fields are substantially similar to the fields described above for FIG. 6, and further comprise a plurality of header extension fields. The header extension fields accommodate, for example, tag stack 1800 including tag sets 1801, 1802, and 1803, each substantially of the form of the tag set of 1700 (FIG. 7). Complex content tagging characterizes a limited number of devices and content substitutions as the content progresses through the IP network. In other words, according to an embodiment of the present invention, tag stack 1800 can be inserted into the RTP extended header portion 1603 of the IP transport network (e.g., per Internet Engineering Task Force (IETF) Request for Comment (RFC) 3550 section 5.3.1 "RTP: A Transport Protocol for Real-Time Applications"). As tag stack 1800 grows or changes, each tagging device will alter the pertinent RTP extended header information, including changing the tag stack. Specifically, the example field layout represents content that has passed through three devices (e.g., source device 110, intermediary stream processor device 120, and an ad insertion device 130). In this example, all three of these devices are assumed to have made a modification to the payload, and therefore have made modification to the RTP headers adding respective tag sets (e.g., 1801, 1802, and 1803) to tag stack 1800. As the media stream is forwarded through the network, additional tag sets (e.g., 9-byte blocks) are appended to the tag stack 1800 with the appropriate changes in the length value of the RTP length field 1602 for each successive modifying device the media stream passes through.

By way of example, the following values are provided by source and other devices encountered by the media stream in 9-byte block example tag sets (shown in FIG. 7) inserted in the extended header field illustrated in FIG. 8. The 9-byte block example tag set 1801 for the source device may include: a 1-bit block flag field (e.g., Off=0), a 3-bit type field (e.g., initial=001), a 4-bit reserved space field (e.g., empty=0000), a 32-bit device id field (e.g., 10.10.10.10 in decimal notation or in binary 00001010 00001010 00001010 00001010), and a 32-bit Content ID (e.g., WABC or in binary 01010111 01000001 01000010 01000011). The 9-byte block example tag set 1802 for an intermediate device may include: a 1-bit block flag field (e.g., Off=0), a 3-bit type field (e.g., transit=010), a 4-bit reserved space field (e.g., empty=0000), a 32-bit device id field (e.g., 20.20.20.20 in decimal notation or in binary 00010100 00010100 00010100 00010100), and a 32-bit Content ID (e.g., WABC or in binary 01010111 01000001 01000010 01000011). The 9-byte block example tag set 1803 for an ad insertion device may include: a 1-bit block flag field (e.g., Off=0), a 3-bit type field (e.g., substitute=011), a 4-bit reserved space field (e.g., empty=0000), a 32-bit device id field (e.g., 30.30.30.30 in decimal notation or in binary 00011110 00011110 00011110 00011110), and a 32-bit Content ID (e.g., A001 or in binary 01000001 00000000 00000000 00000001).

Conventional network layer devices (e.g., routers and switches) do not inspect the payload of a packet to determine whether received content of a media stream differs from expected media stream content. However, in the case where content tagging is inserted into the RTP Extended Headers of the media stream, network layer devices (e.g., routers or switches) can be configured to perform content tagging. For example, these network layer devices may be configured to examine or inspect the content and generate a notification indicating a condition of the media stream content (e.g., content change, verify advertising content, or perform other remedial tasks). In other words, the RTP protocol may be used to enable content tagging at Layer-3 in the network, so that potentially routing and switching devices can be configured to monitor or inspect the media stream content and perform an intervening function (e.g., preventing undesired content from being delivered to end users). Specifically, RTP extended headers could be used to contain the relevant information. It is important to ensure that the overall transmission performance is not impacted negatively. Furthermore, Real-time Transport Control Protocol (RTCP) messages or Simple Network Management Protocol (SNMP) polling data could be sent to northbound management systems (e.g., an interface found in carrier-grade network elements that communicates with network and service management systems and provides details of the network or service) to report the condition of the examined content of the media stream. In addition, these network layer devices may be configured to add tag sets allowing increased visibility into the path of a media stream. For example, a network management system could be configured to assemble an end-to-end composite view of the media stream based on received RTCP messages or SNMP polling data.

Figure 9:
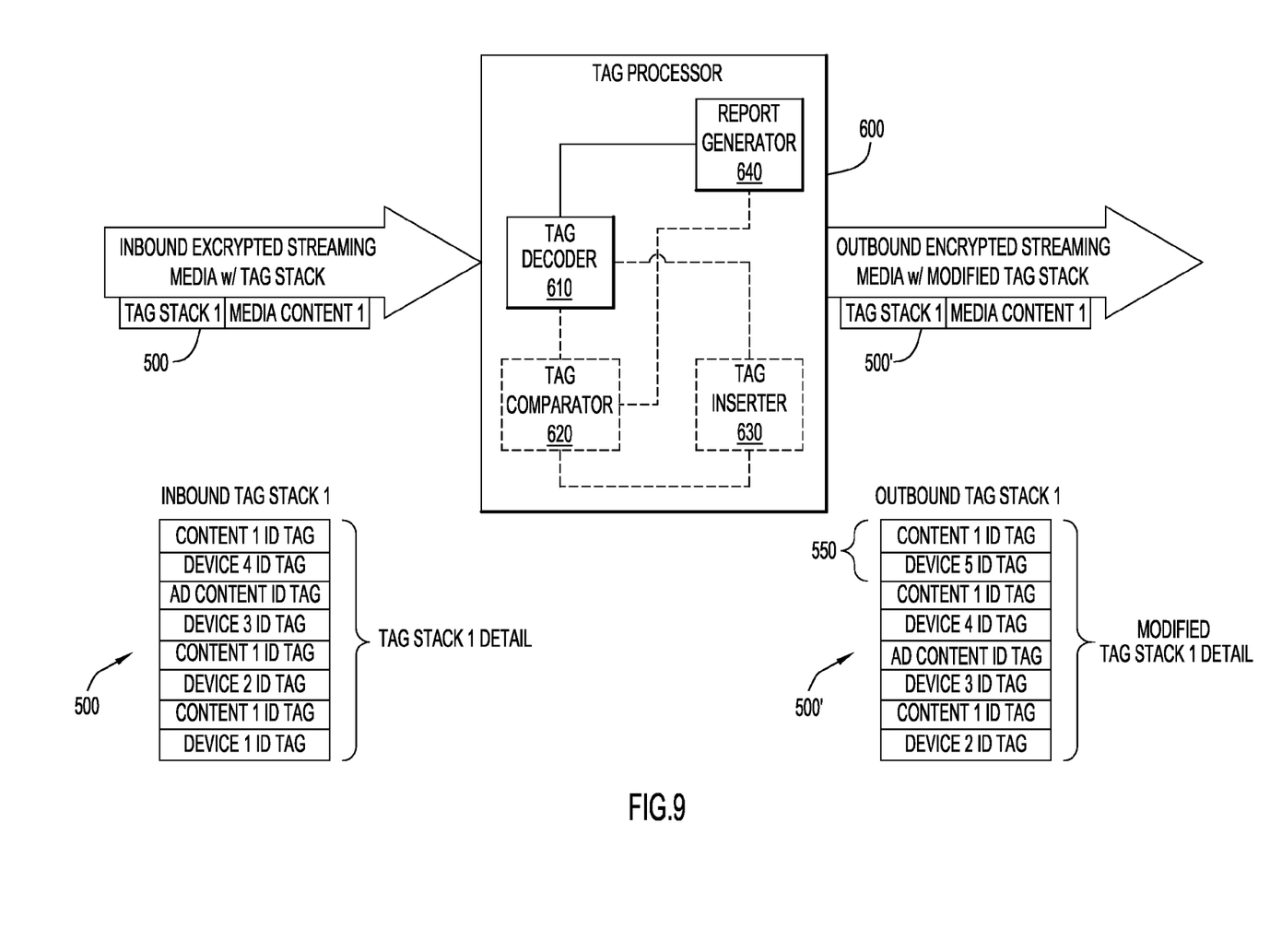
FIG. 9 is a block diagram of a tag processor providing content tagging according to an embodiment of the present invention.

An example tag processor employing content tagging according to an embodiment of the present invention is illustrated in FIG. 9. Tagging devices (e.g., media manipulation devices 100, media transport devices 200, media transport access service devices 300, and media receiver devices 400, etc.) may be equipped with the tag processor to employ content tagging according to an embodiment of the present invention. The tag processor may be embodied as hardware devices, logic encoded in tangible media for execution, or any combinations thereof. A tag processor 600 includes a tag decoder 610, and a report generator 640. The tag processor may further include at least one of: a tag comparator 620, and a tag inserter 630. The tag processor is configured to receive an inbound media stream including, for example, tag stack 500. Tag decoder 610 is configured to inspect tag stack 500 of the received media stream and identify a content id of the tag stack. Comparator 620 is configured to compare the identified content id to an expected content id, provided to tag processor 600. An expected content id may be provided to the tag processor via, for example, out-of-band signaling or via a programmatic interface. Furthermore, tag processor 600 may be configured to query a trusted source for the desired (i.e., expected) content id. Optionally, the tag processor may be configured to perform a media stream function (e.g., blocking or not forwarding the received media stream, forwarding an alternative media stream instead of the received media stream, or generate a report indicating a condition of the content) in response to the comparison between the identified content id and the expected content id or in response to a value of a field contained in tag stack 500 of the received media stream.

Tag processor 600 may further comprise a tag inserter 630 configured to insert a tag set in a tag stack of a received media stream to provide a modified tag stack to be forwarded with the media stream. Tag inserter 630 may, for example, insert tag set 550 in a tag stack 500 of the inbound media stream, and forward an outbound media stream including the modified tag stack 500'. The inserted tag set comprises a content id indicating the content of the forwarded media stream and a device id identifying the tagging device. In the case where the content of the media stream is substituted with an alternative content, the tag inserter 630 may be further configured to insert a substitute tag into the media stream indicating the substitute content.

Report generator 640 is configured to generate a report to be forwarded to a system management device (e.g., a service manager) or to be stored locally within the network device. Examples of generated report data include, but are not limited to: data relating to at least the content of the media stream (e.g., the value of a content id of an inserted tag set), a listing of the type and/or number of devices the media stream has advanced through, a listing of the type and/or number of tag sets inserted into the tag stack, a listing of any ad content and/or ad content id tags that have been inserted in the media stream, whether content of the media stream matches expected content, and whether content of the media stream is to be blocked.

In the case of a media stream being received by an intermediary device which is configured to splice media into the media stream (e.g., an ad splicer), when a splice event occurs, the intermediary device may append, for example, tag set 530 to tag stack 500. The tag set includes an ad content id indicating the content of the spliced media. Optionally, appended tag set 530 may include a device id indicating ad splicer 130. The modified media stream, including modified tag stack 500' and the spliced media, is subsequently forwarded through the network. A tag processor of a device close to or at an intended destination (e.g., Edge QAM or STB) receiving the forwarded media stream can inspect the tag stack of the modified media stream including the ad content id and can generate a report (e.g., an ad delivery verification report) indicating that the spliced media had been delivered to the intended destination.

In the case of a media stream being received by a destination receiver (e.g., a QAM modulator or STB), tag processor 600 of the destination receiver inspects and compares a content id of the tag stack to an expected content id and determines if the content of the received media stream was intended to be received by the destination receiver device. In other words, tag processor 600 is provided the expected content id in order to make a valid comparison. An expected content id may be provided to the tag processor via, for example, out-of-band signaling or via a programmatic interface. Furthermore, tag processor 600 may be configured to query a trusted source for the desired (i.e., expected) content id. Optionally, in the case of content substitution for an advertisement, the ad insertion device (e.g., ad splicer) could broadcast a change notification message (e.g., via IP multicast group packet broadcast) to tell the downstream receiver what the alternative value (i.e., expected content id) should be.

In a further embodiment of the present invention, in the event that the content id comparison indicates that the received content id of the media stream differs from the expected content id, tag comparator 620 is configured to perform a fault management process. Examples of fault management processes include, but are not limited to: blocking the media stream, displaying a static frame, splicing an alternate media stream into the forwarded media stream, or generate an exception report indicating the value of the received content id and/or that the received media stream contained content that differed from the expected content.

Figure 10:
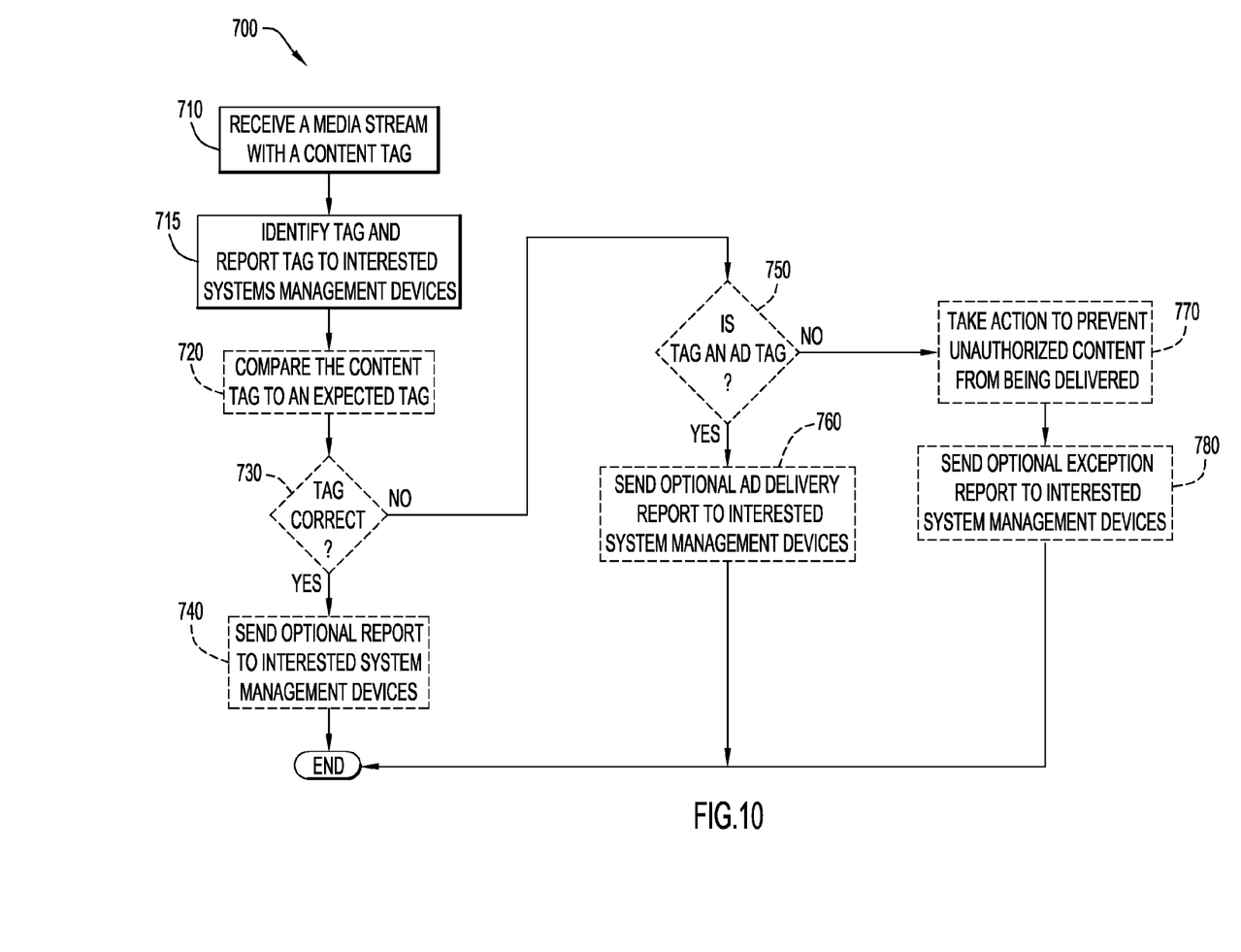
FIG. 10 is a procedural flow diagram illustrating the manner in which content tagging is employed with a media stream according to an embodiment of the present invention.

The manner in which content tagging of a media stream is performed (e.g., by tag processor 600) is illustrated in FIG. 10. Initially, a media stream is received at a source and a tag set including a content id is inserted into the tag stack by the source device and selectively by intermediate devices receiving the media stream in the network as described above. In particular, the media stream including the tag stack with a tag set is received at step 710 (e.g., by a media manipulation device (120, 130, 140)). The tag set is identified and reported by the device to a system management device at step 715. The tag set may be inspected and a content id of the received tag set may be compared to an expected content id at step 720. In response to the comparison resulting in a match, the media stream is processed (e.g., forwarding or conveying to an end-user) and a media stream delivery report (e.g., a content delivery verification report indicating the value of the content id of the received tag set matches an expected content id) may be generated for forwarding to a system management device (e.g., a service manager) or may be stored locally within a network device performing the tagging operation at step 740. In response to the comparison resulting in a difference between the received and expected content ids, the received content id tag is examined to determine the presence of an ad tag at step 750. In the event that the content id tag is determined to be an ad tag, an ad delivery report (e.g., an ad content delivery verification report) may be generated for forwarding to a system management device (e.g., a service manager) at step 760. In the event that the received content tag is determined not to be an ad tag, preventive action (e.g., block content of the received media stream from being forwarded, or introduce an alternative content to the forwarded media stream) is taken at step 770, and an exception report (e.g., a report indicating the value of the content id of the received tag set and/or that undesired content was received and blocked) is generated for forwarding to a system management device (e.g., a service manager) at step 780.

It will be appreciated that the embodiments described above and illustrated in the drawings represent only a few of the many ways of implementing content tagging of media streams.

The media stream processing devices (e.g., media manipulation devices, media transport devices, media receiver devices, media transport access service devices, etc.) providing content tagging of a media stream according to the present invention may include any quantity of any conventional or other components and may process the media stream employing any suitable protocol and over any suitable energy form (e.g., optical signals, microwave, radio signals, etc.).

The tag processor of the present invention may be implemented by any conventional or other microprocessor, controller or circuitry to perform the functions described herein, while any quantity of processors or processing devices or circuitry may be employed within one or more of the media stream processing devices, where the tag processor functions may be distributed in any fashion among any quantity of hardware or software modules, processors or other processing devices or circuits. The software for the tag processor may be implemented in any suitable computer language, and could be developed by one of ordinary skill in the computer and/or programming arts based on the functional description contained herein and the flow chart illustrated in the drawings. The techniques described above and illustrated in the flow chart may be modified in any manner that accomplishes the functions described herein.

The tag processor components (e.g., tag decoder, tag comparator, report generator, and tag inserter, etc.) of the present invention may be implemented by any quantity of any conventional or other components performing the functions described herein. These components may be implemented in hardware and/or software by any processors and/or circuitry. Alternatively, the tag processor may include software and/or hardware modules to implement any individual function or any combinations of these functions. The present invention may reside as an external module disposed at any suitable location and coupled to components of the media stream processing device or may be integrated with any desired media stream processing device components. The tag processor may be included in any device in the network and the network may include any number of devices comprising a tag processor. However, not all devices in the network need to comprise a tag processor in order to perform content tagging.

The software or logic of the present invention embodiments may be available on tangible media (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

A tag set generated by a media stream processing device, according to the present invention, may contain fields representative of any feature of the media stream including, but not limited to: the content being delivered, encoding type of the media stream, the devices used in the delivery of the media, the source of the media, or the tag itself. Further, these fields may be of any size suitable for the serving protocol and may include any desired information. The content and device ids may include any quantity of any suitable characters or symbols to identify content or device.

The present invention may employ content tagging of any desired media stream (e.g., audio, video, etc.) in any communication system and may utilize any desired protocol (e.g., MPEG-2, RTP, etc.). Further, the present invention may manage the tag sets of a media stream tag stack according to any pre-determined criteria (e.g., FIFO buffering). Further, the tag stack may be placed in any location of the media stream and may be of any size and any structure. The tag stack may be arranged in any form (e.g., a queue, a list, an array, etc.).

It is to be understood that the present invention is not limited to the applications described herein, but may be utilized for various applications (e.g., on demand or live streaming media (e.g., streaming audio, streaming video), etc.). Further, the present invention may be used in any data communication system in which identification of any content (e.g., media, data, etc.) is desired. In addition, it is to be understood that the functions or methods of the present invention embodiments described herein may be performed in any desired order. Similarly, it is to be understood that the functions or methods of the present invention embodiments recited in the claims may be performed in any desired order, where the outline and/or labels for these functions appearing in the claims do not imply or infer any specific order for performing the functions.

From the foregoing description, it will be appreciated that the invention makes available a novel communication system and method for content tagging and validation of received content of media streams.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method, comprising:
   (a) receiving a media stream at a source device and inserting into the media stream a first tag indicating content of the media stream and the source device providing the first tag, wherein the media stream is sent from the source device through a network to a desired destination;
   (b) in response to a network device receiving the media stream prior to the desired destination:
   (b.1) identifying and reporting the first tag within the received media stream,
   (b.2) selectively inserting into the media stream a second tag indicating content of the media stream and the network device providing the tag,
   (b.3) creating a tag stack comprising the first tag and the second tag in the media stream, and
   (b.4) selectively forwarding the media stream with the tag stack through the network toward the desired destination; and
   (c) in response to the desired destination including the network device receiving the media stream:
   (c.1) identifying a value of each of the first tag and the second tag of the tag stack within the received media stream;
   (c.2) comparing the identified value of at least one of the first tag and the second tag to an expected tag value; and
   (c.3) in the event that the comparison indicates a match, delivering the media stream to a user interface.

2. The method of claim 1, wherein step (b) further comprises:
   (b.1a) identifying a value of the first tag within the received media stream;
   (b.2a) comparing the identified value to an expected tag value; and
   (b.3a) in the event that the comparison indicates a match, forwarding the media stream with the inserted first tag through the network toward the desired destination.

3. The method of claim 2, wherein in the event that one of the comparisons indicates a match at the network device, generating and forwarding a content verification report to a system management device, the verification report indicating that the identified tag value matches the expected tag value.

4. The method of claim 2, wherein step (b.2a) further comprises:
   (b.2a.1) in the event that the comparison indicates a difference between the identified tag value and the expected tag value, forwarding the media stream through the network in response to the identified tag being a substitute tag indicating substitution of the media stream content; and step (c.3) further comprises:
   (c.3.1) in the event that the comparison indicates a difference between the identified tag value and the expected tag value, delivering the media stream to the user interface in response to the identified tag being a substitute tag indicating substitution of the media stream content.

5. The method of claim 4, wherein step (b.2a) further comprises:
   (b.2a.2) generating and forwarding a substitution content delivery verification report to a system management device, the substitution content delivery verification report indicating that the identified tag is determined to be a substitute tag; and
   step (c.3) further comprises:
   (c.3.2) generating and forwarding a substitution content delivery verification report to a system management device, the substitution content delivery verification report indicating that the identified tag is determined to be a substitute tag.

6. The method of claim 1, wherein step (b) further comprises:
   (b.1a) substituting the content of the media stream with an alternative content; and
   (b.2a) inserting a substitute tag into the media stream indicating the substitute content.

7. The method of claim 1, wherein the media stream is packetized according to a real-time transport protocol (RTP) and the tag is inserted within at least one of a synchronization source (SSRC) identifier field, a contributing source (CSRC) identifier field and an extension field of the RTP packet header.

8. A network device, comprising:
   a tag processor encoded for execution on a processing device associated with the network device and configured to process a media stream at the network device, wherein the media stream is sent through a network to a desired destination, the network device operative to:
   receive the media stream at the network device;
   identify a first tag associated with the media stream indicating content of the media stream and a source device providing the first tag;
   compare a value of the identified first tag with an expected value;
   in response to the comparison indicating that the value of the identified first tag does not match the expected value, selectively insert, by a tag inserter module, into the media stream a second tag indicating content of the media stream and the network device providing the second tag;
   creating a tag stack comprising the first tag and the second tag in the media stream; and selectively forwarding the media stream with the tag stack through the network toward the desired destination.

9. The network device of claim 8, wherein the tag processor includes the tag inserter module to insert a substitute tag into the media stream when the content of the media stream is substituted with substitute content.

10. The network device of claim 9, wherein the tag processor forwards the media stream to the user in response to a comparison of at least one tag value to an expected value not indicating a match and at least one tag of the tag stack being the substitute tag.

11. The network device of claim 10, wherein the network device further comprises:
   a report generator module configured to generate and forward one or more reports to a system management device, the reports indicating one or more conditions of the identified tag value matching the expected tag value and the identified tag being a substitute tag.

12. The network device of claim 8, wherein the media stream is packetized according to a real-time transport protocol (RTP) and the tag inserter module inserts the tag within at least one of a synchronization source (SSRC) identifier field, a contributing source (CSRC) identifier field and an extension field of the RTP packet header.

13. The network device of claim 8, wherein the network device is one of a source device providing the media stream, a routing device, a multiplexing device, a translating device, a content splicing device, an encoding device, an encryption device, a transport service device, and a receiving device for providing the media stream content to a user.

14. Logic encoded in a non-transitory medium for execution and when executed operable to perform a method comprising:
   (a) receive a media stream at a source device and insert into the media stream a first tag indicating content of the media stream and the source device providing the tag, wherein the media stream is sent from the source device through a network to a desired destination;
   (b) in response to a network device receiving the media steam at a network device prior to the desired destination:
   (b.1) identify and report the first tag within the received media stream,
   (b.2) selectively insert into the media stream a second tag indicating content of the media stream and the network device providing the tag
   (b.3) create a tag stack comprising the first tag and the second tag in the media stream, and
   (b.4) selectively forward the media stream with the tag stack through the network toward the desired destination; and
   (c) in response to the desired destination including the network device receiving the media stream:
   (c.1) identify a value of the tag within the received media stream;
   (c.2) compare the identified value to an expected tag value; and
   (c.3) in the event that the comparison indicates a match, deliver the media stream to a user interface.

15. The logic encoded in a non-transitory medium of claim 14, wherein step (b) further comprises:
   (b.1a) identify a value of the first tag within the received media stream;
   (b.2a) compare the identified value to an expected tag value; and
   (b.3a) in the event that the comparison indicates a match, forward the media stream with the inserted tag through the network toward the desired destination.

16. The logic encoded in a non-transitory medium of claim 15, wherein in the event that one of the comparisons indicates a match at the network device, generate and forward a content verification report to a system management device, the verification report indicating that the identified tag value matches the expected tag value.

17. The logic encoded in a non-transitory medium of claim 15, wherein step (b.2a) further comprises:
   (b.2a.1) in the event that the comparison indicates a difference between the identified tag value and the expected tag value, forward the media stream through the network in response to the identified tag being a substitute tag indicating substitution of the media stream content;
   and step (c.3) further comprises:
   (c.3.1) in the event that the comparison indicates a difference between the identified tag value and the expected tag value, deliver the media stream to the user interface in response to the identified tag being a substitute tag indicating substitution of the media stream content.

18. The logic encoded in a non-transitory medium of claim 17, wherein step (b.2a) further comprises:
   (b.2a.2) generate and forward a substitution content delivery verification report to a system management device, the substitution content delivery verification report indicating that the identified tag is determined to be a substitute tag; and
   step (c.3) further comprises:
   (c.3.2) generate and forward a substitution content delivery verification report to a system management device, the substitution content delivery verification report indicating that the identified tag is determined to be a substitute tag.

19. The logic encoded in a non-transitory medium of claim 14, wherein step (b) further comprises:
   (b.1a) substitute the content of the media stream with an alternative content; and
   (b.2a) insert a substitute tag into the media stream indicating the substitute content.

20. The logic encoded in a non-transitory medium of claim 14, wherein the media stream is packetized according to a realtime transport protocol (RTP) and the tag stack is inserted within at least one of a synchronization source (SSRC) identifier field, a contributing source (CSRC) identifier field and an extension field of the RTP packet header.

* * * * *